1150X
Simmons & Raguet,
Cotton-Bale Tie,
Patented Nov. 7, 1809.
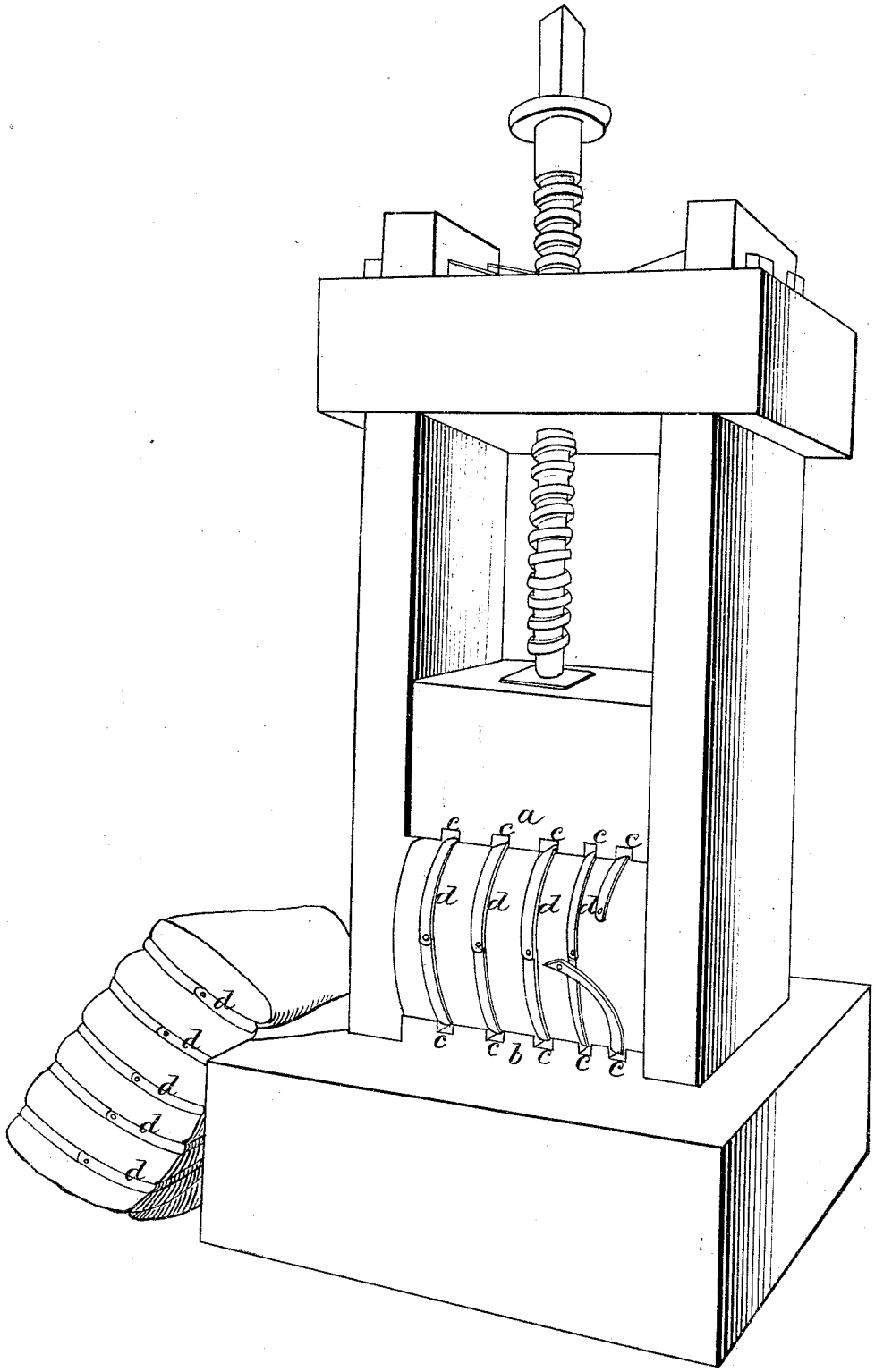

1150X

UNITED STATES PATENT OFFICE.

DAVID P. SIMMONS AND CONDY RAGUET, OF PHILADELPHIA, PA.

IMPROVEMENT IN THE MODE OF AFFIXING IRON AROUND BALES OF COTTON, HAY, SKINS, AND OTHER MERCHANDISE.

Specification forming part of Letters Patent dated November 7, 1809.

*To all whom it may concern:*

Be it known that we, DAVID P. SIMMONS and CONDY RAGUET, of Philadelphia, in the county of Philadelphia and State of Pennsylvania, have invented an Improvement in the Mode of Affixing Iron around Bales of Cotton, Hay, Skins, and other Merchandise, of which the following is a specification.

After the article is compressed by the power of a machine into the requisite state of compactness, the boxes which surround it and preserve it in its square shape are removed. On the upper surface of the bottom piece of the machine on which the bale rests is a number of grooves cut across large enough to permit the iron, whether hoop, rod, or wire, to pass through. The iron is then consequently put through these grooves and passed up the side of the bale, care being taken to beat it with a hammer at the angle of the bale where it turns up, in order to make it fit close. In the upper or pressing piece of the machine are also grooves corresponding to others and diametrically opposite to them. Through these grooves is also passed the same iron as in the former case. Nothing now remains but to fasten the ends of each piece of iron together. For this purpose they are caused to meet at one of the sides of the bale. If it be hoop-iron, holes are punched through it, and one or two small rivets of iron are therein riveted by means of a hammer and a solid piece of metal placed between the hoop-iron and the bale. If the iron used be rod or wire, the two ends are fastened together by being in the first place bent like hooks, then hooked together, and afterward twisted with pinchers. The power of the machine is then removed, and the bale is completed and will retain its shape with very little variation.

Cotton, as usual, must have bagging around it; but hay, tobacco-stems, &c., are bound up in their loose state, except with the addition of three staves placed lengthwise under and three on the top of the bale. Three to five hoops are requisite for each bale.

DAVID P. SIMMONS,
CONDY RAGUET,
*Administrators of the estate of James Simmons.*

Witnesses:
JOHN B. SIMMONS,
JAS. MCKEAN.